(12) United States Patent
Senoo

(10) Patent No.: US 7,979,511 B2
(45) Date of Patent: Jul. 12, 2011

(54) NETWORK SYSTEM

(75) Inventor: Junya Senoo, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 234 days.

(21) Appl. No.: 12/140,680

(22) Filed: Jun. 17, 2008

(65) Prior Publication Data

US 2008/0310763 A1 Dec. 18, 2008

(30) Foreign Application Priority Data

Jun. 18, 2007 (JP) ................... 2007-160582

(51) Int. Cl.
*G06F 15/16* (2006.01)
(52) U.S. Cl. ........................................ 709/219
(58) Field of Classification Search .................. 709/219; 707/999.01
See application file for complete search history.

(56) References Cited

U.S. PATENT DOCUMENTS

| | | | |
|---|---|---|---|
| 6,629,104 B1* | 9/2003 | Parulski et al. ................. | 1/1 |
| 2002/0078172 A1 | 6/2002 | Yoshikai et al. | |
| 2002/0087601 A1* | 7/2002 | Anderson et al. ............. | 707/515 |
| 2002/0135801 A1* | 9/2002 | Tessman et al. ............. | 358/1.15 |
| 2003/0154190 A1* | 8/2003 | Misawa et al. .................... | 707/1 |
| 2003/0184653 A1 | 10/2003 | Ohkubo | |
| 2007/0058930 A1* | 3/2007 | Iwamoto ....................... | 386/83 |
| 2007/0064609 A1* | 3/2007 | Igarashi ....................... | 370/230 |
| 2007/0203874 A1* | 8/2007 | Cave et al. ....................... | 707/1 |
| 2008/0147726 A1* | 6/2008 | Hwang et al. ................ | 707/104.1 |
| 2008/0310763 A1* | 12/2008 | Senoo ........................ | 382/305 |

FOREIGN PATENT DOCUMENTS

| | | |
|---|---|---|
| EP | 1 783 636 A1 | 5/2007 |
| EP | 1 821 537 A1 | 8/2007 |
| JP | 2002-312402 A | 10/2002 |
| JP | 2003-199028 A | 7/2003 |
| JP | 2003-319309 A | 11/2003 |
| JP | 2004-96582 A | 3/2004 |
| JP | 2004-173306 A | 6/2004 |
| JP | 2004-355493 A | 12/2004 |
| JP | 2006-165918 A | 6/2006 |
| JP | 2006-295256 A | 10/2006 |

OTHER PUBLICATIONS

Tesic, J.; , "Metadata practices for consumer photos," Multimedia, IEEE, vol. 12, No. 3, pp. 86-92, Jul.-Sep. 2005 doi: 10.1109/MMUL.2005.50.*

* cited by examiner

Primary Examiner — Ajay Bhatia
(74) Attorney, Agent, or Firm — Crowell & Moring LLP

(57) ABSTRACT

A network system in which a client device is connected to a server via a LAN. A CPU in the client device obtains date data of respective still picture files from the respective servers and generates representative thumbnail picture. Subsequently, the CPU in the client device generates a directory of a still picture taken on each photographing date, associates the directory with the thumbnail picture of the representative picture of each photographing date, and then displays a list of the representative thumbnail pictures. When a user selects the representative thumbnail picture which is taken on a date identical with a desired still picture from the respective thumbnail pictures, the CPU in the client device obtains all still pictures which are to be stored in the directory associated with the selected representative thumbnail picture from a storage medium in the server, and then generates thumbnail pictures of the still pictures.

5 Claims, 5 Drawing Sheets

NETWORK SYSTEM

BACKGROUND OF THE INVENTION

1. Field of the Invention

The present invention relates to a network system in which a client device is connected to a server and particularly relates to a network system which enables a user to look for a still picture which the user wishes to view in numerous still pictures stored in the server from the client device.

2. Description of the Related Art

Conventionally, a network system conforming to DLNA guideline (Digital Living Network Alliance guideline, which is a technical specification to connect audio-visual (AV) equipments, personal computers, and information appliances to each other for cooperative usage by using home LAN (Local Area Network) (home network), abbreviated as DLNA hereinafter) is known as the above network system. In the DLNA, a DMS (Digital Media Server) which records, stores, and provides contents is provided as the server, and a DMP (Digital Media Player) which reproduces the contents of the DMS is provided as the client. Once hooked up to a network, both DMS and DMP are operational, and the DMP finds the DMS in the network and obtains a list of the available contents automatically. Thus, once the above DLNA compliant equipment is hooked up to the network, the contents of other equipments are available automatically. For example, a network attached storages, which are file service machines, personal computers, DVD/HDD recorders, and video cameras can be used as the DMS, and AV equipments such as television receivers, notebook computers, and personal digital assistants (PDA) can be used as the DMP, and moreover, one equipment may have functions of both DMS and DMP.

Each still picture file stored in the above DMS is normally provided with a file name, which is automatically created in each digital camera for each data of still pictures which are taken with the digital camera, and is stored in a storage medium such as IC card of the digital camera temporarily, and subsequently, transmitted from the storage medium to be stored in the DMS.

The digital camera automatically creates the file name in accordance with DCF (Design rule for Camera File system) and records the still picture file for the still pictures, which are taken with the digital camera, in the storage medium. In the DCF, each digital camera manufacturer adds an arbitrary character to three directory numbers to set a directory name and arranges three arbitrary characters, four directory numbers, and an extension sequentially to set the file name. Moreover, data of the above file include a photographing date and time, so that a photographing date and time of each still picture is stored in the file data.

Normally, it is uncommon for the user to determine the directory name and a hierarchy of the pictures by himself/herself when storing the still picture taken with the digital camera in the server, and the still picture file for the still pictures, which are taken with the digital camera, is often stored in the recording medium with the directory name which is automatically created in the digital camera when taking the picture.

In the DMP connected to the network of the above DLNA, when the user wishes to view a still picture of a photograph, which is taken with the digital camera, in the contents which are stored in each DMS connected to the network, a search process shown in FIG. 7, for example, is performed: the user operates the DMP to specify the DMS (S101), further specify the directory of the still picture stored in the specified DMS (S102), and search the directory whose name is identical with that of the directory created automatically in the digital camera and move down the hierarchy sequentially for search, so that the still picture which the user wishes to view is found and displayed (S103). However, in the above search process, when still pictures which are taken with digital cameras of different manufacturers are mixedly stored in the server, for example, it is difficult to determine what types of the still pictures are in each directory based on simply the directory names created in each digital camera.

Consequently, in the conventional process for searching the still picture, the user is required to remember which directory the desired still picture is stored in the DMS, and unless the user remembers the directory in which the desired still picture is stored, it is difficult to search the desired still picture easily. Moreover, because capacities of a storage medium of the picture data such as a memory card using a nonvolatile memory, a HDD (hard disk) using magnetic disks, and so on get larger, a total amount of the still picture files which can be stored in the respective storage mediums in the digital camera and the server increases dramatically. As a result, the time for searching the desired still picture file in many still picture files stored in the storage medium gets even longer, so that a means for searching the desired still picture more easily is coveted.

As shown in Japanese Laid-Open Patent Publication No. 2004-96582, there is a known picture file management method which creates a directory in a storage medium in accordance with a date on which pictures in the picture files are taken (photographing date), arranges number symbols which represent the photographing date so as to set a name of the directory for each directory, and stores the picture file of the picture whose photographing dates corresponds to the directory. This picture file management method enables an easy storage management of the picture file. However, unless the user remembers which picture is taken on the photographing date, the desired picture file cannot easily be found just by seeing the name of the picture file which is made up of the number symbols which represent the photographing date.

There is a known recording apparatus which encodes data as an encoded data of a predetermined codec level and codec class to classify a codec with a predetermined encoding system and makes a storage medium store the encoded data as a file whose name represents the codec level of the encoded data (refer to Japanese Laid-Open Patent Publication No. 2006-165918, for example). However, in this apparatus, when the name of the encoded data file in a directory which includes letters representing the codec encoding system is displayed, a thumbnail is located in an area immediately in front of the file name, and the presence and absence of this thumbnail shows whether or not the encoded data can be decoded by the codec of the apparatus, so that it is not easy to find the desired still picture file only by the directory name.

There is a known digital camera which transmits picture data taken with the digital camera to a personal computer in a home network and a server on Internet via a network so that the picture data are stored in the personal computer and the server and the picture data in the digital camera is stored more certainly (refer to Japanese Laid-Open Patent Publication No. 2003-319309, for example). In this digital camera, the still pictures are stored in a holder (directory) whose name includes a photographing date, however, the desired still picture cannot immediately be found just by seeing the holder name.

SUMMARY OF THE INVENTION

An object of the present invention is to provide a network system which enables a user to obtain a desired still picture in a server on a network from a client side efficiently and rapidly.

According to the present invention, this object is achieved by a network system comprising: a server which includes a storage medium to store a still picture file including a still picture and data of photographing date (date on which the still picture is taken) of the still picture for each still picture which is taken with a digital camera; and a client device which is connected to the server via a network to search the still picture stored in the storage medium in the server via the network.

Therein the server further includes a server side communication means to communicate with the client device.

And therein the client device includes: a client side communication means to communicate with the server via the network; a server detecting means to detect all servers connected on the network by communicating with the server side communication means by the client side communication means; a date data acquisition means to obtain date data from all still picture files which are stored in storage mediums in all the servers detected by the server detecting means; a picture selection means to select one representative still picture (abbreviated as the representative picture hereinafter) from still pictures which are taken on respective dates for all photographing dates corresponding to the date data obtained by the date data acquisition means; a representative picture acquisition means to obtain the representative picture of each photographing date from the storage medium in the server; a representative thumbnail picture generation means to generate each thumbnail picture corresponding to the representative picture of each photographing date obtained by the representative picture acquisition means; a directory generation means to generates a directory of the still picture of each photographing date for every photographing date corresponding to the date data obtained by the date data acquisition means; an association means to associate a thumbnail picture of the representative picture of each photographing date generated by the representative thumbnail picture generation means with a directory of the still picture of each photographing date generated by the directory generation means; a representative thumbnail picture list display means to display a list of the thumbnail pictures of the respective representative pictures (abbreviated as the representative thumbnail picture hereinafter) generated by the representative thumbnail picture generation means; a directory picture acquisition means to obtain all still pictures which are to be stored in the directory associated with the selected representative thumbnail pictures (all still pictures having a photographing date identical with the selected representative thumbnail picture) from the storage medium in the server when a user selects the representative thumbnail picture, which is taken on a date identical with a desired still picture, in the respective representative thumbnail pictures displayed on the representative thumbnail picture list display means; an in-directory thumbnail picture generation means to generate thumbnail pictures of all the still pictures obtained by the directory picture acquisition means; and an in-directory thumbnail picture list display means to display a list of the respective thumbnail pictures generated by the in-directory thumbnail picture generation means.

According to the above configuration, the directories of the still pictures for each photographing date are created for the still picture files stored in all the servers on the network, and the directories are associated with the representative thumbnail pictures for each photographing date. Moreover, the list of the representative thumbnail pictures can automatically be displayed. Consequently, the user can visually search the desired still picture by seeing not only the photographing dates but also the representative thumbnail pictures corresponding to the photographing dates to remember an event on the photographing date, so that the desired still picture can be searched efficiently and rapidly. Moreover, when searching the still picture files, the user does not need to access the server on the network individually and moreover, the user can easily find the directory which includes the desired still picture in the list of the representative thumbnails, which is automatically displayed, without thinking which directory stores the desired still picture file in the respective servers. Consequently, even the user which forgets the name of the directory storing the still pictures or even a person which does not know the name of the directory can recognize the directory which includes the desired still picture by finding the representative thumbnail picture which is associated with the desired still picture, so that any person in the family can easily search the desired still picture, for example. Moreover, the data which are obtained from all the servers include only the photographing dates, so that the client device does not need a large capacity memory particularly.

Preferably, a still picture of the earliest photographing date is selected from still pictures taken on the respective dates as the representative picture. Thus, the user can easily remember the event on the photographing date from the representative thumbnail picture of the first still picture on each photographing date and can easily find the desired still picture by seeing the representative thumbnail pictures.

Further preferably, the representative thumbnail picture list display means displays respective representative thumbnail pictures generated by the representative thumbnail picture generation means in ascending order of photographing date. Thus, the user can easily find the directory of the desired still picture from the list of the thumbnail pictures listed in ascending order of photographing date.

While the novel features of the present invention are set forth in the appended claims, the present invention will be better understood from the following detailed description taken in conjunction with the drawings.

BRIEF DESCRIPTION OF THE DRAWINGS

The present invention will be described below with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1:
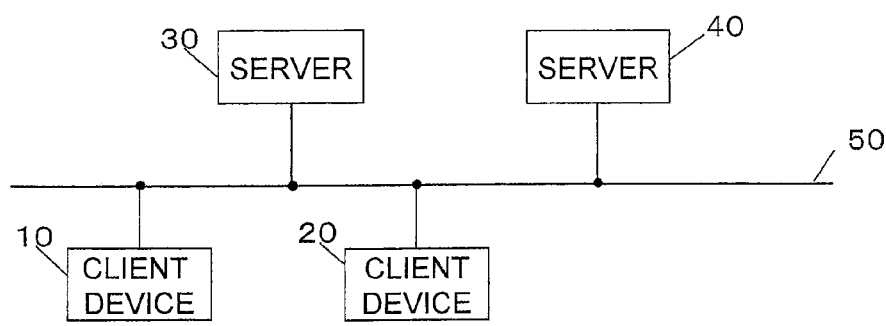
FIG. 1 is a schematic diagram of a network system according to a preferred embodiment of the present invention.

A network system (abbreviated as NW system hereinafter) according to a preferred embodiment of the present invention is described below with reference to FIGS. 1 to 6. FIG. 1 is a block diagram showing a configuration of the NW system of the present preferred embodiment. The NW system includes at least one client device (two client devices 10 and 20 in the present preferred embodiment) and at least one server (two servers 30 and 40 in the present preferred embodiment) and is a DLNA-compatible network system. The servers 30 and 40 are connected to the client devices 10 and 20 via a network 50 by a LAN. In this NW system, the respective client devices 10 and 20 require contents to the servers 30 and 40, and the servers 30 and 40 transmit the contents in response to the requests from the respective client devices 10 and 20, and the respective client devices 10 and 20 receive the contents from the servers 30 and 40 and subsequently reproduce the contents. The client device 10 has the same constitution with the client device 20 basically, and the server 30 also has the same constitution with the server 40 basically, so that the description of the constitution of the client device 20 and the server 40 is omitted here.

Figure 2:
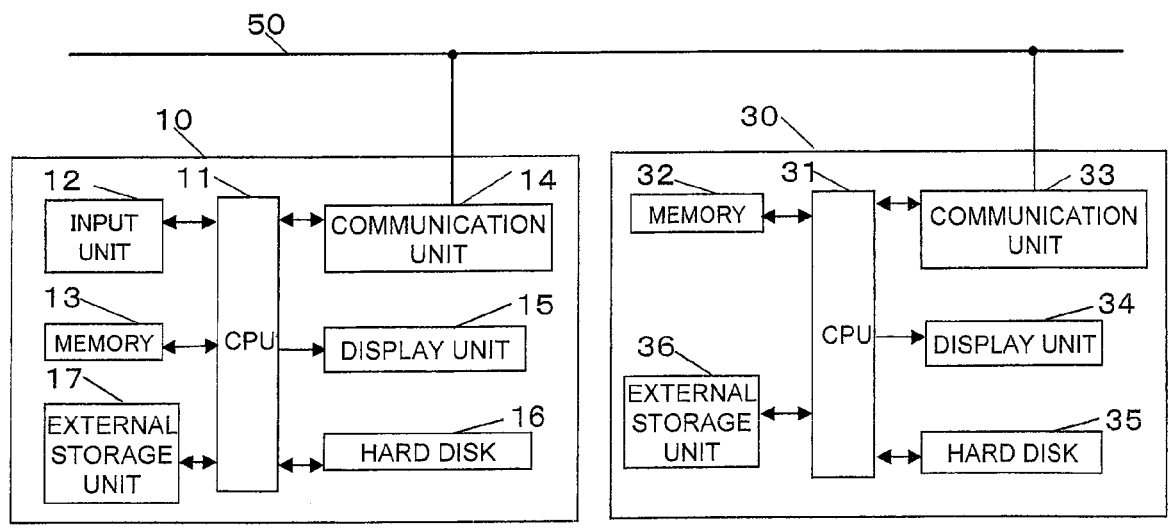
FIG. 2 is an electrical block diagram of a client device and a server in the network system in FIG. 1.

FIG. 2 is an electrical block diagram of the client device 10 and the server 30 which are connected via the network 50. When the client device 10 is a DMP compliant personal computer which conforms to DLNA and when the server 30 is a DMS server which conforms to DLNA, the NW system of the present preferred embodiment can call up the contents of the DMS server (still pictures in a digital camera, for example) from the DMP compliant personal computer and display the still pictures or the like on a screen of the personal computer.

The above client device 10 includes a CPU 11, an input unit 12, a memory 13, a communication unit (client side communication means) 14, a display unit 15, a hard disk 16, and an external storage unit 17. The client device 10 is connected to the servers 30 and 40 via the network 50 and searches the still picture stored in storage mediums of the servers 30 and 40 via the network.

Figure 3:
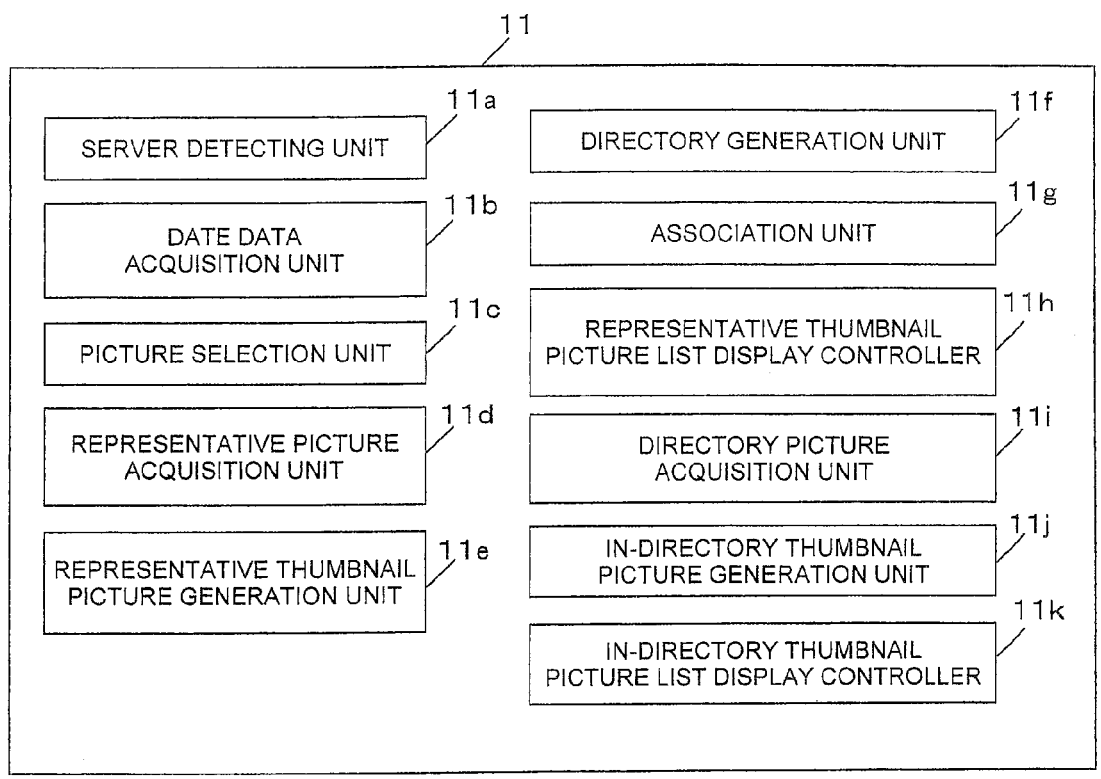
FIG. 3 is a configuration diagram of a CPU in the client device in FIG. 2.

As shown in FIG. 3, the CPU 11, which controls the whole client device 10 and performs a protocol processing of inputted/outputted data, includes a server detecting unit (server detecting means) 11*a*, a date data acquisition unit (date data acquisition means) 11*b*, a picture selection unit (picture selection means) 11*c*, a representative picture acquisition unit (representative picture acquisition means) 11*d*, a representative thumbnail picture generation unit (representative thumbnail picture generation means) 11*e*, a directory generation unit (directory generation means) 11*f*, an association unit (association means) 11*g*, a representative thumbnail picture list display controller (representative thumbnail picture list display means) 11*h*, a directory picture acquisition unit (directory picture acquisition means) 11*i*, an in-directory thumbnail picture generation unit (in-directory thumbnail picture generation means) 11*j*, and an in-directory thumbnail picture list display controller (in-directory thumbnail picture list display means) 11*k*.

In the above CPU 11, the server detecting unit 11*a* detects the server 30 by performing communication with a communication unit 33 in the server 30 via the communication unit 14 and also detects all the servers which are connected via the network 50 by performing the similar communication. The date data acquisition unit 11*b* obtains the date data from all still picture files which are stored in the storage mediums (a hard disk 35 and an external storage unit 36 in the server 30 and so on) in all the servers detected by the server detecting unit 11*a*. The picture selection unit 11*c* selects one representative still picture (abbreviated as the representative picture hereinafter) from the still pictures which are taken on the same date for all photographing dates corresponding to the date data obtained by the date data acquisition unit 11*b*. The representative picture acquisition unit 11*d* obtains the representative picture of each photographing date from the storage mediums in the servers (the server 30, the server 40, and so on). The representative thumbnail picture generation unit 11*e* generates a thumbnail picture of the representative picture which is obtained by the representative picture acquisition unit 11*d* for each photographing date.

The directory generation unit 11*f* generates a directory of the still picture of each photographing date for every photographing date corresponding to the date data obtained by the date data acquisition unit 11*b*. The association unit (association means) 11*g* associates the thumbnail picture of the representative picture of each photographing date generated by the representative thumbnail picture generation unit 11*e* with the directory of the still picture of each photographing date generated by the directory generation unit 11*f*. The representative thumbnail picture list display controller 11*h* displays a list of the thumbnail pictures of the respective representative pictures (abbreviated as the representative thumbnail picture hereinafter) generated by the representative thumbnail picture generation unit 11*e*. When the user selects the representative thumbnail picture, which is taken on the same date with the desired still picture, in the respective representative thumbnail pictures which the representative thumbnail picture list display controller 11*h* displays on the display unit 15, the directory picture acquisition unit 11*i* obtains all the still pictures in the directory associated with the selected representative thumbnail picture from the storage mediums in the server 30 and the server 40. The in-directory thumbnail picture generation unit 11*j* generates thumbnail pictures of all the still pictures obtained by the directory picture acquisition unit 11*i*. The in-directory thumbnail picture list display controller 11*k* displays a list of the respective thumbnail pictures generated by the in-directory thumbnail picture generation unit 11*j* on the display unit 15.

When the client device 10 is a DMP compliant equipment which conforms to DLNA and when the server 30 is a DMS compliant server which conforms to DLNA, for example, the server on the network 50 can be detected by the above server detecting unit 11*a* through an automatic recognition of the server by a protocol which is specified by UPnP Device Architecture standard used in DLNA.

The input unit 12 is designed for an operation of the user to input necessary data to the client device 10, and the user can perform an input operation and a select operation such as a data input, a data selection, or the like on a display screen on the display unit 15 through a key operation using a keyboard of a personal computer or a remote controller or a touch operation using a touch panel provided on the display screen or the like.

The memory 13 is made up of ROM, RAM and Flash ROM which store a program or the like necessary for various control operations performed by the CPU 11. The hard disk 16 stores a control program which controls the client device 10, a representative thumbnail picture list which is displayed by the representative thumbnail picture list display controller 11*h*, a in-directory thumbnail picture list which is displayed by the in-directory thumbnail picture list display controller 11*k* constantly or temporarily. The part of the data stored in the hard disk 16 may also be stored in the memory 13. Moreover, the external storage unit 17 is a removable storage medium which can be externally inserted and connected to the client device 10 such as, for example, a memory card of non-volatile memory which stores the still pictures taken with the digital camera in the client device 10 side. The still pictures stored in the external storage unit 17 are normally transmitted to and stored in the hard disk 16.

The communication unit 14, which is connected to the communication unit 33 via the network, is a communication device which transmits and receives data between the client device 10 and the server 30, and the communication device is a LAN controller which controls a LAN network which constitutes the home network. As such a communication device, Ethernet (registered trademark), Wi-Fi (Wireless Fidelity) of wireless LAN standard, Power Line Communications, and so on can be used, for example. The above communication devices can be used as network interface cards.

The display unit 15 displays picture data which include contents provided by the server 30, and also displays the representative thumbnail picture list or the in-directory thumbnail picture list based on the controls of the representative thumbnail picture list display controller 11h or the in-directory thumbnail picture list display controller 11k, respectively.

The server 30, which includes a CPU 31, a memory 32, the communication unit (server side communication means) 33, a display unit 34, a hard disk (storage medium) 35, and a removable external storage unit (storage unit) 36, is connected to the client device 10 via the network 50 so as to provide the contents stored in the storage medium to the client device 10 via the network 50.

The CPU 31 controls the whole server 30 and performs a protocol processing of the data inputted/outputted by the server 30, a database management to select the contents in response to the request from the client device 10, a readout of the contents stored in the hard disk 35 and the external storage unit 36, and so on.

The memory 32 is made up of ROM, RAM and Flash ROM which store a program or the like necessary for various control operations performed by the CPU 31. As described above, the communication unit 33 transmits and receives the data between the client device 10 and the server 30 with the communication unit 14 in the client device 10. The display unit 34 displays contents data of the hard disk 35 and so on.

The hard disk 35 stores server programs and further stores the still pictures taken with the digital camera and/or contents of music, video, and so on. The hard disk 35, whose system is controlled by the CPU 31, provides the stored contents to the client device 10 based on a search control performed by the CPU 11 in the client device 10. The external storage unit 36 is a removable storage medium which can be externally inserted and connected to the server 30 such as, for example, a memory card of non-volatile memory which stores the still pictures taken with the digital camera in the server 30 side. The still pictures stored in the external storage unit 36 can be transmitted to and stored in the hard disk 35. The still picture files including the respective still pictures, which are taken with the digital camera, and the data of photographing dates are stored for each still picture in the hard disk 35 and the external storage unit 36.

In the above configuration, when the client device 10 and the server 30 are started and a network connection between them is completed, the CPU 11 in the client device 10 detects all the servers which are connected via the network 50 (the servers 30 and 40 here), obtains the date data from all the still picture files in the servers, and subsequently generates the directory of the still picture for every photographing date corresponding to the date data. Furthermore, the CPU 11 associates the representative thumbnail picture in the still pictures taken on each photographing date with the directory, and displays the representative thumbnail picture list in which the representative thumbnail picture of each photographing date is located next to the directory. Subsequently, when the user selects one representative thumbnail picture of the directory from the representative thumbnail picture list, the CPU 11 displays all the thumbnail pictures of all the still pictures in the directory, and moreover when the user selects the desired thumbnail picture from all the thumbnail pictures, the CPU 11 displays the desired original still picture (non-thumbnailed picture). Consequently, the user can easily find the directory which includes the desired still picture not only by the dates but also the representative thumbnail pictures, so that the desired still picture can be found rapidly.

Figure 4:
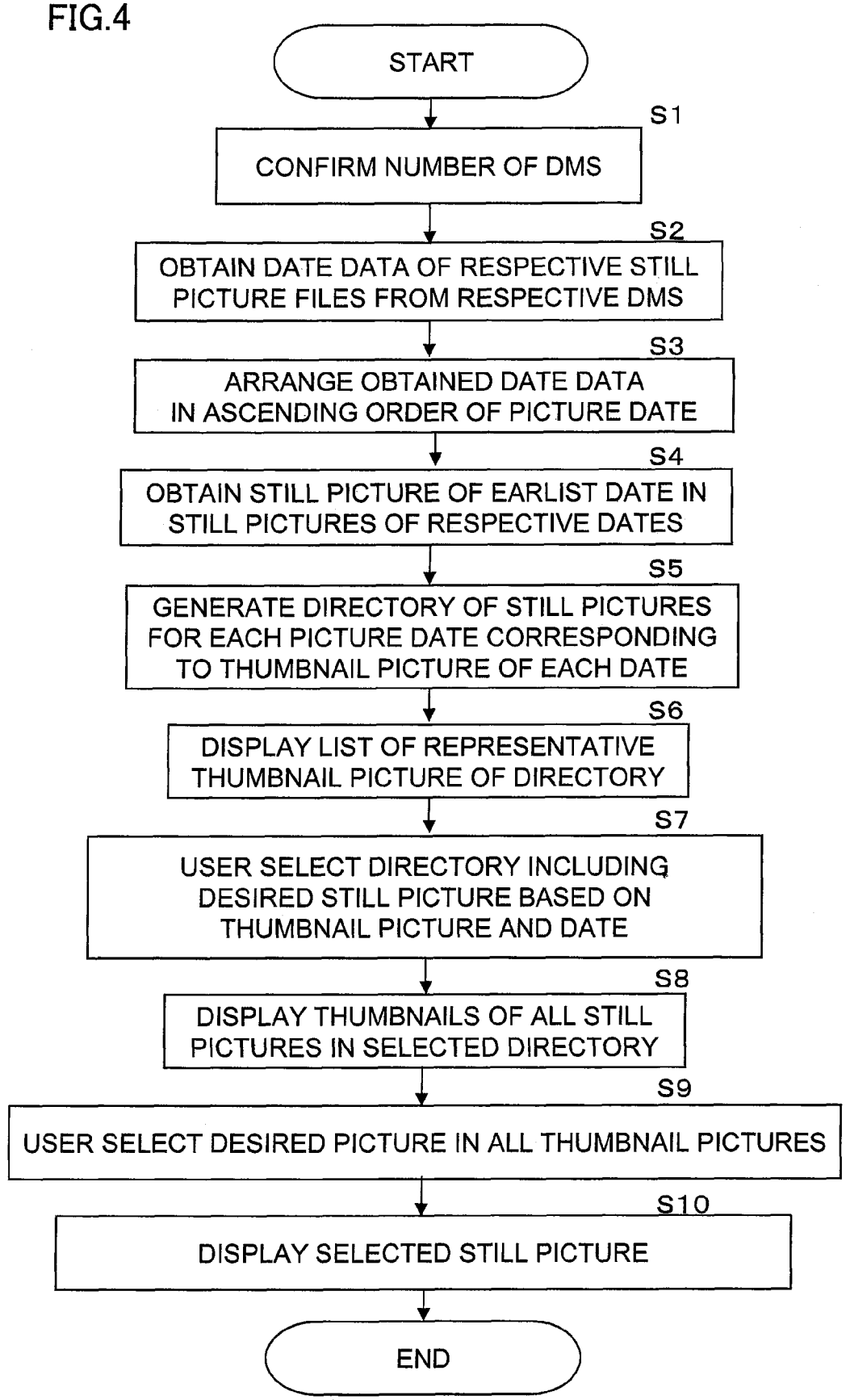
FIG. 4 is a flow chart for describing an operation process in the network system in FIG. 1.

The operation process of the above network system is described with reference to FIG. 4. Firstly the client device 10 which is the DMP connected to the network and the servers 30 and 40 which are the DMS connected to the network are started, and then when the network connection is completed, the CPU 11 in the client device 10 makes the server detecting unit 11a detect all the servers (the servers 30 and 40 here) which are connected via the network 50 to detect the number of servers (S1). Moreover, the CPU 11 makes the date data acquisition unit 11b obtain the date data from all the still picture files stored in the storage mediums (the hard disk 35, the external storage unit 36, and so on in the server 30) of all the detected servers (the servers 30 and 40) (S2) and arrange the date data in ascending order of photographing date (S3).

Subsequently, the CPU 11 makes the picture selection unit 11c select the still picture of the earliest time in the still pictures taken on each photographing date as one representative still picture (abbreviated as the representative picture hereinafter) for all the photographing dates corresponding to the date data. The CPU 11 makes the representative picture acquisition unit 11d obtain the representative pictures of the respective photographing dates from the storage mediums of the servers 30 and 40 and makes the representative thumbnail picture generation unit 11e generate the thumbnail pictures of the obtained representative pictures of the respective photographing dates (S4). Moreover, the CPU 11 makes the directory generation unit 11f generate the directories of the still pictures of the respective photographing dates for all photographing dates corresponding to the date data obtained by the date data acquisition unit 11b (S5).

Subsequently, the CPU 11 makes the association unit 11g associate the thumbnail pictures of the representative pictures of the respective photographing dates generated by the representative thumbnail picture generation unit 11e with the directories of the still pictures of the respective photographing dates generated by the directory generation unit 11f and display the photographing dates next to (for example, above) the representative thumbnail pictures of the representative photographing dates. Subsequently, the CPU 11 makes the representative thumbnail picture list display controller 11h display the list of the respective representative thumbnail pictures generated by the representative thumbnail picture generation unit 11e on the display unit 15 (S6).

Moreover, when the user selects a directory by selecting the representative thumbnail picture which is taken on the same date with the desired still picture from the respective thumbnail pictures displayed on the display unit 15 by the representative thumbnail picture list display controller 11h (S7), the CPU 11 makes the directory picture acquisition unit 11i obtain all the still pictures to be stored in the directory associated with the selected representative thumbnail picture (obtain all the still pictures which have the same photographing date as the selected representative thumbnail picture) from the storage medium in the server 30. Subsequently, the CPU 11 makes the in-directory thumbnail picture generation unit 11j generate the thumbnail pictures for all the still pictures in the selected directory (abbreviated as the in-directory thumbnail picture, hereinafter) and makes the in-directory thumbnail picture list display controller 11k display the list of the in-directory thumbnail pictures on the display unit 15 (S8). When the user selects the thumbnail picture of the desired still picture from the in-directory thumbnail picture list (S9), the CPU 11 displays the original still picture (the still picture not yet thumbnailed) of the selected thumbnail picture (S10). Consequently, the user can easily find the directory which includes the desired still picture by seeing the representative thumbnail pictures located together with the dates, so that the desired still picture can visually be found rapidly.

Figure 5:
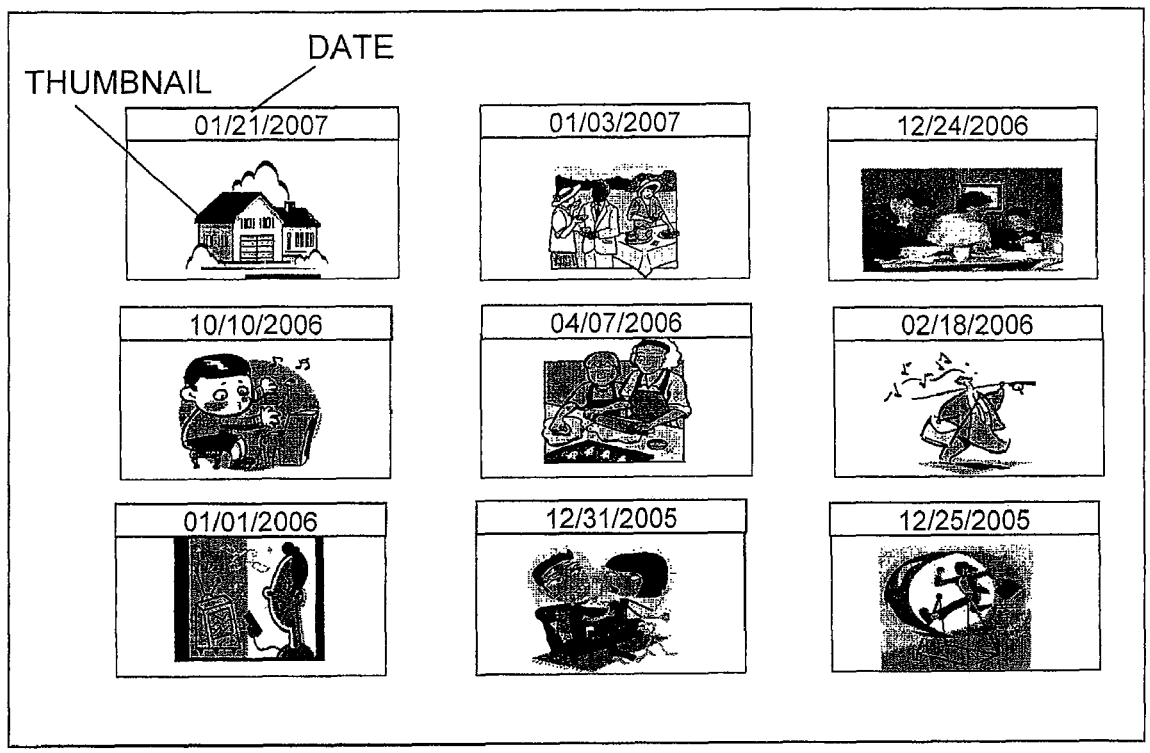
FIG. 5 is a diagram showing an example of a list of representative thumbnail pictures in the network system in FIG. 1.
Figure 6:
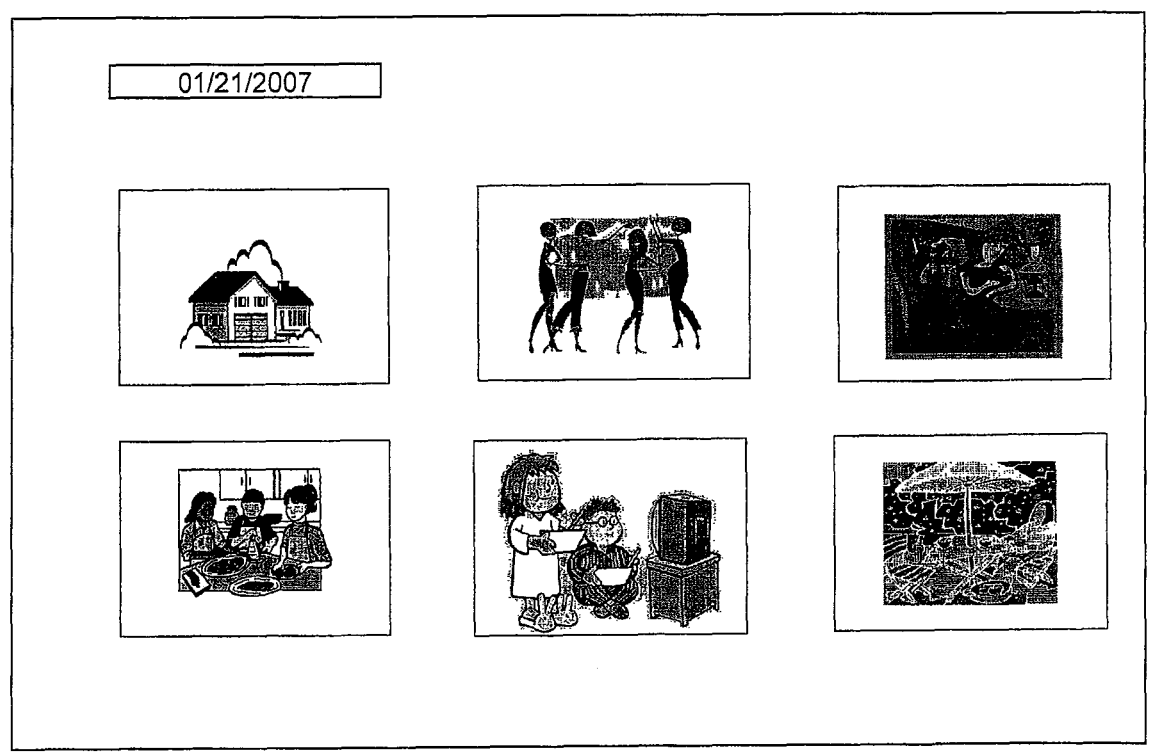
FIG. 6 is a diagram showing an example of a list of in-directory thumbnail pictures in the network system in FIG. 1.
Figure 7:
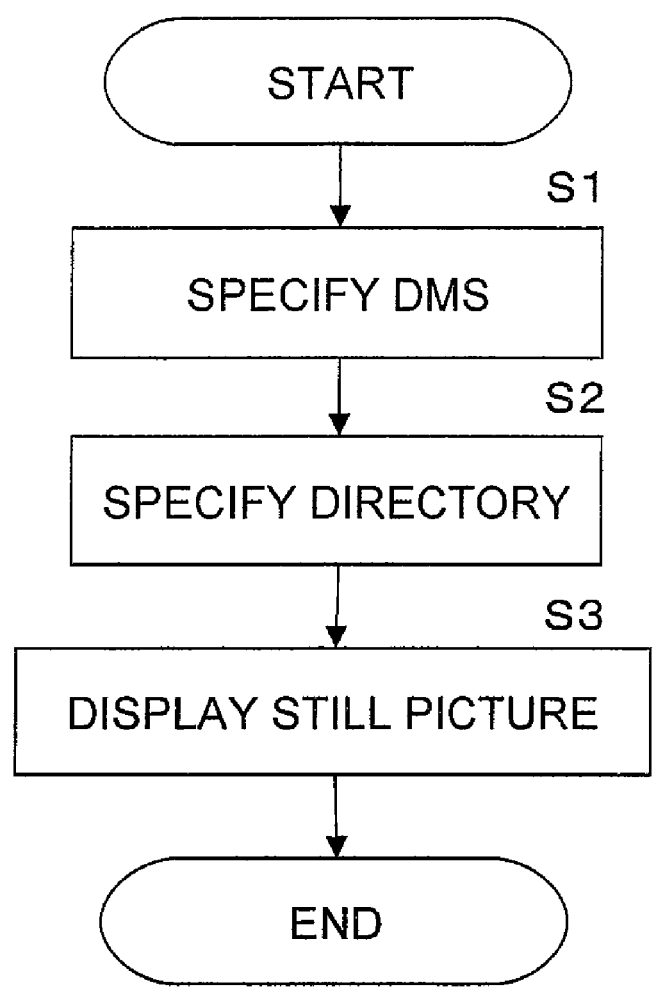
FIG. 7 is a flow chart for describing an operation process in the conventional network system.

FIG. 5 shows an example of the representative thumbnail picture list displayed on the display unit 15 by the above representative thumbnail picture list display controller 11h. Also, FIG. 6 shows the in-directory thumbnail picture list displayed on the display unit 15 by the in-directory thumbnail picture list display controller 11k. At that time, when the user selects the directory of the photographing date Jan. 21, 2007 from the representative thumbnail picture list in FIG. 5 with reference to the thumbnail pictures, as shown in FIG. 6, the list of the thumbnail pictures which correspond to the still pictures included in the directory of the photographing date Jan. 21, 2007 is displayed. When the user further selects the thumbnail picture of the desired still picture from the thumbnail picture list in the directory, the original still picture of the selected thumbnail picture (not shown) is displayed. Consequently, the user can easily find the desired still picture by selecting the representative thumbnail picture located together with the photographing date.

As described above, according to the NW system of the present preferred embodiment, the directories of the still pictures for each photographing date are created for the still picture files stored in all the servers on the network, and the directories are associated with the representative thumbnail pictures for each photographing date, and moreover, the list of the representative thumbnail pictures is automatically displayed. Consequently, the user can visually search the desired still picture by seeing not only the photographing dates but also the representative thumbnail pictures corresponding to the photographing dates to remember the event on the photographing date, so that the desired still picture can be searched efficiently, rapidly, and certainly. Moreover, when searching the still picture files, the user does not need to access the server on the network individually and moreover, the user can easily find the directory which includes the desired still picture in the list of the representative thumbnail pictures, which is automatically displayed, without thinking which directory stores the desired still picture file in the respective servers. Consequently, even the user which forgets the name of the directory storing the still pictures or even a person which does not know the name of the directory can recognize the directory which includes the desired still picture by finding the representative thumbnail picture which is associated with the desired still picture, so that any person in the family can easily search the desired still picture, for example. Moreover, the data which are obtained from all the servers include only the photographing dates, so that the client device does not need a large capacity memory particularly.

Moreover, the thumbnail picture of the still picture of the earliest photographing date is displayed as the representative thumbnail pictures for each photographing date, so that the user can see the representative thumbnail picture which shows the first still pictures in each photographing date and can easily remember the event on the photographing date, and thereby can easily find the desired still picture by seeing the representative thumbnail pictures.

Furthermore, the respective representative thumbnail pictures are listed in ascending order of photographing date, so that the user can easily find the directory of the desired still picture from the list of the thumbnail pictures listed in ascending order of photographing date.

Still furthermore, the client device and the network conform to the standard of DLNA guideline, so that the NW system of the present preferred embodiment enables the data communication between the server and the client device automatically just by connecting them via the network and also enables the search, thus the user can easily set the network connection and can also perform the search easily.

The present invention is not limited to the configuration of the above preferred embodiment, however, various modification are applicable within the scope of the invention. For example, the thumbnail pictures in the in-directory thumbnail picture list can be listed in ascending order in the same manner as a normal arrangement of photo albums. Thus, the desired picture can easily be searched as a usual habit. Moreover, in the above preferred embodiment, the directory of the still pictures of each photographing date is generated, however, the directory of the still pictures which are taken in respective months or years can also be generated, respectively, so that the desired photo picture can be searched more easily from the large number of photo pictures stored and piled up in the DMS and the DMP based on the data of the photographing month or year. Moreover, in the above preferred embodiment, the picture of the earliest date is selected as the representative picture of the still pictures of each photographing date, however, the latest picture may also be selected as the representative picture. Furthermore, if the server creates the directory together with the date and the thumbnail of the still picture file automatically, it is also possible to access the server from any client device at any time and find the desired still picture easily. Still furthermore, as long as the server and the client device can mutually search the contents stored in the server and the client device via the network, any network system which does not conform to the standard of DLNA guideline is also applicable.

What is claimed is:
1. A network system comprising:
a server which includes a storage medium to store a still picture file including a still picture and data of photographing date (date on which the still picture is taken) of the still picture for each still picture which is taken with a digital camera; and
a client device which is connected to the server via a network to search the still picture stored in the storage medium in the server via the network,
wherein the server further includes a server side communication means to communicate with the client device and
the client device includes:
a client side communication means to communicate with the server via the network;
a server detecting means to detect all servers connected on the network by communicating with the server side communication means by the client side communication means;
a date data acquisition means to obtain date data from all still picture files which are stored in storage mediums in all the servers detected by the server detecting means;
a picture selection means to select one representative still picture (abbreviated as the representative picture hereinafter) from still pictures which are taken on respective dates for all photographing dates corresponding to the date data obtained by the date data acquisition means;

a representative picture acquisition means to obtain the representative picture of each photographing date from the storage medium in the server;

a representative thumbnail picture generation means to generate each thumbnail picture corresponding to the representative picture of each photographing date obtained by the representative picture acquisition means;

a directory generation means to generate a directory of the still picture of each photographing date for every photographing date corresponding to the date data obtained by the date data acquisition means;

an association means to associate a thumbnail picture of the representative picture of each photographing date generated by the representative thumbnail picture generation means with a directory of the still picture of each photographing date generated by the directory generation means;

a representative thumbnail picture list display means to display a list of the thumbnail pictures of the respective representative pictures (abbreviated as the representative thumbnail picture hereinafter) generated by the representative thumbnail picture generation means;

a directory picture acquisition means to obtain all still pictures which are to be stored in the directory associated with the selected representative thumbnail pictures (all still pictures having a photographing date identical with the selected representative thumbnail picture) from the storage medium in the server when a user selects the representative thumbnail picture, which is taken on a date identical with a desired still picture, in the respective representative thumbnail pictures displayed on the representative thumbnail picture list display means;

an in-directory thumbnail picture generation means to generate thumbnail pictures of all the still pictures obtained by the directory picture acquisition means; and an in-directory thumbnail picture list display means to display a list of the respective thumbnail pictures generated by the in-directory thumbnail picture generation means;

wherein the representative thumbnail picture list display means displays respective representative thumbnail pictures of each photographing date which are generated by the representative thumbnail picture generation means in ascending order of photographing date; and wherein the respective representative thumbnail pictures are associated with separate directories generated by the directory generation means.

2. The network system according to claim 1, wherein a still picture of the earliest photographing date is selected from still pictures taken on the respective dates as the representative picture.

3. The network system according to claim 2, wherein the server, the client device and the network conform to a standard of DLNA guideline (Digital Living Network Alliance guideline) version 1.5.

4. The network system according to claim 1, wherein the server, the client device and the network conform to a standard of DLNA guideline (Digital Living Network Alliance guideline) version 1.5.

5. A network system comprising:
a server which includes a storage medium to store a still picture file including a still picture and data of photographing date of the still picture for each still picture which is taken with a digital camera; and a client device which is connected to the server via a network to search the still picture stored in the storage medium in the server via the network, wherein the server further includes a server side communication unit that communicate with the client device, and the client device includes:
a client side communication unit that communicates with the server via the network;

a server detecting unit that detects all servers connected on the network by communicating with the server side communication unit by the client side communication unit;

a date data acquisition unit to obtain date data from all still picture files which are stored in storage mediums in all the servers detected by the server detecting unit;

a picture selection unit that selects one representative picture from still pictures which are taken on respective dates for all photographing dates corresponding to the date data obtained by the date data acquisition unit;

a representative picture acquisition unit that obtains the representative picture of each photographing date from the storage medium in the server;

a representative thumbnail picture generation unit that generates each thumbnail picture corresponding to the representative picture of each photographing date obtained by the representative picture acquisition unit;

a directory generation unit that generates a directory of the still picture of each photographing date for every photographing date corresponding to the date data obtained by the date data acquisition unit;

an association unit that associates a thumbnail picture of the representative picture of each photographing date generated by the representative thumbnail picture generation unit with a directory of the still picture of each photographing date generated by the directory generation unit;

a representative thumbnail picture list display unit that displays a list of the thumbnail pictures of the respective representative pictures as representative thumbnail pictures generated by the representative thumbnail picture generation unit;

a directory picture acquisition unit that obtains all still pictures which are to be stored in the directory associated with the selected representative thumbnail pictures having a photographing date identical with the selected representative thumbnail picture from the storage medium in the server when a user selects the representative thumbnail picture, which is taken on a date identical with a desired still picture, in the respective representative thumbnail pictures displayed on the representative thumbnail picture list display unit;

an in-directory thumbnail picture generation unit that generates thumbnail pictures of all the still pictures obtained by the directory picture acquisition unit; and an in-directory thumbnail picture list display unit that displays a list of the respective thumbnail pictures generated by the in-directory thumbnail picture generation unit;

wherein the representative thumbnail picture list display unit displays respective representative thumbnail pictures of each photographing date which are generated by the representative thumbnail picture generation unit in ascending order of photographing date; and wherein the respective representative thumbnail pictures are associated with separate directories generated by the directory generation means.

* * * * *